US011677248B2

(12) United States Patent
Kuo et al.

(10) Patent No.: US 11,677,248 B2
(45) Date of Patent: Jun. 13, 2023

(54) ELECTRONIC DEVICE

(71) Applicant: Quanta Computer Inc., Taoyuan (TW)

(72) Inventors: Hsin-Chih Kuo, Taoyuan (TW); Ming-Chieh Lee, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 215 days.

(21) Appl. No.: 17/163,725

(22) Filed: Feb. 1, 2021

(65) Prior Publication Data
US 2022/0190618 A1    Jun. 16, 2022

(30) Foreign Application Priority Data

Dec. 16, 2020  (TW) ................. 109144361

(51) Int. Cl.
*H02J 7/00* (2006.01)
*G06F 1/26* (2006.01)
*H02J 9/06* (2006.01)
*H02J 7/02* (2016.01)

(52) U.S. Cl.
CPC .......... *H02J 7/00308* (2020.01); *G06F 1/263* (2013.01); *H02J 7/0024* (2013.01); *H02J 7/0031* (2013.01); *H02J 9/061* (2013.01); *H02J 7/0047* (2013.01); *H02J 7/02* (2013.01); *H02J 2207/30* (2020.01)

(58) Field of Classification Search
CPC .... H02J 7/00308; H02J 7/0024; H02J 7/0031; H02J 7/0047; H02J 7/02; H02J 2207/30; H02J 9/061; G06F 1/263
USPC ........................................................ 320/134
See application file for complete search history.

(56) References Cited

U.S. PATENT DOCUMENTS 7,463,009 B2  12/2008  Chang et al.
10,256,653 B2  4/2019  Toon et al.
(Continued)

FOREIGN PATENT DOCUMENTS

CN    109075588 A    12/2018
TW    200807791 A    2/2008

OTHER PUBLICATIONS

Chinese language office action dated Aug. 27, 2021, issued in application No. TW 109144361.

*Primary Examiner* — Zixuan Zhou
(74) *Attorney, Agent, or Firm* — McClure, Qualey & Rodack, LLP

(57) ABSTRACT

An electronic device selectively coupled to a first charger and/or a second charger includes a power supply interface, a first comparator, a second comparator, a controller, a first switch circuit, and a second switch circuit. The power supply interface receives a first input voltage and a second input voltage. The first comparator compares the first input voltage with a first reference voltage, so as to generate a first comparison voltage. The second comparator compares the second input voltage with a second reference voltage, so as to generate a second comparison voltage. The controller generates a first control voltage and a second control voltage according to the first comparison voltage and the second comparison voltage. The first switch circuit is selectively enabled or disabled according to the first control voltage. The second switch circuit is selectively enabled or disabled according to the second control voltage.

9 Claims, 2 Drawing Sheets

(56) References Cited

U.S. PATENT DOCUMENTS

| | | | |
|---|---|---|---|
| 2005/0253560 A1* | 11/2005 | Popescu-Stanesti | H02J 1/08 320/138 |
| 2009/0102427 A1* | 4/2009 | Tamegai et al. | H02J 7/00309 320/138 |
| 2014/0008984 A1* | 1/2014 | Kamiyama | H02J 9/06 307/64 |
| 2014/0103862 A1* | 4/2014 | Ahn | H03K 3/02335 307/130 |
| 2014/0266011 A1* | 9/2014 | Mehta | H02M 3/1584 320/107 |
| 2015/0357851 A1* | 12/2015 | Huang | H02J 7/02 320/108 |
| 2017/0279284 A1* | 9/2017 | Lim | H02J 7/0024 |
| 2020/0036220 A1* | 1/2020 | Wu | H02J 1/14 |

* cited by examiner

ELECTRONIC DEVICE

CROSS REFERENCE TO RELATED APPLICATIONS

This application claims priority of Taiwan Patent Application No. 109144361 filed on Dec. 16, 2020, the entirety of which is incorporated by reference herein.

BACKGROUND OF THE INVENTION

Field of the Invention

The disclosure generally relates to an electronic device, and more particularly, it relates to an electronic device that is used for automatic detection.

Description of the Related Art

Conventional electronic devices cannot immediately detect the removal of an AC (Alternating Current) power source such as a charger, and this may cause the electronic device to perform the wrong function. Accordingly, there is a need to propose a novel solution for solving this problem of the prior art.

BRIEF SUMMARY OF THE INVENTION

In an exemplary embodiment, the disclosure is directed to an electronic device which is selectively coupled to a first charger and/or a second charger. The electronic device includes a power supply interface, a first comparator, a second comparator, a controller, a first switch circuit, and a second switch circuit. The power supply interface includes a first input port and a second input port. The first input port is arranged for receiving a first input voltage. The second input port is arranged for receiving a second input voltage. The first comparator compares the first input voltage with a first reference voltage, so as to generate a first comparison voltage. The second comparator compares the second input voltage with a second reference voltage, so as to generate a second comparison voltage. The controller generates a first control voltage and a second control voltage according to the first comparison voltage and the second comparison voltage. The first switch circuit is coupled between the first input port and the controller. The first switch circuit is selectively enabled or disabled according to the first control voltage. The second switch circuit is coupled between the second input port and the controller. The second switch circuit is selectively enabled or disabled according to the second control voltage.

In some embodiments, the power supply interface supports the USB (Universal Serial Bus) Type-C standard.

In some embodiments, the first reference voltage is substantially equal to 75% of the rated output voltage of the first charger.

In some embodiments, the first comparator has a positive input terminal for receiving the first input voltage, a negative input terminal for receiving the first reference voltage, and an output terminal for outputting the first comparison voltage.

In some embodiments, the second reference voltage is substantially equal to 75% of the rated output voltage of the second charger.

In some embodiments, the second comparator has a positive input terminal for receiving the second input voltage, a negative input terminal for receiving the second reference voltage, and an output terminal for outputting the second comparison voltage.

In some embodiments, the first switch circuit includes a first switch element and a first diode. The first switch element has a first terminal coupled to the first input port of the power supply interface, and a second terminal coupled to a first node. The first diode has an anode coupled to the first node, and a cathode coupled to a common node. The common node is further coupled to the controller. The first switch element is selectively closed or opened according to the first control voltage.

In some embodiments, after a first AC (Alternating Current) power source relative to the first charger is removed, the first switch element is immediately opened.

In some embodiments, the second switch circuit includes a second switch element and a second diode. The second switch element has a first terminal coupled to the second input port of the power supply interface, and a second terminal coupled to a second node. The second diode has an anode coupled to the second node, and a cathode coupled to the common node. The second switch element is selectively closed or opened according to the second control voltage.

In some embodiments, after a second AC power source relative to the second charger is removed, the second switch element is immediately opened.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
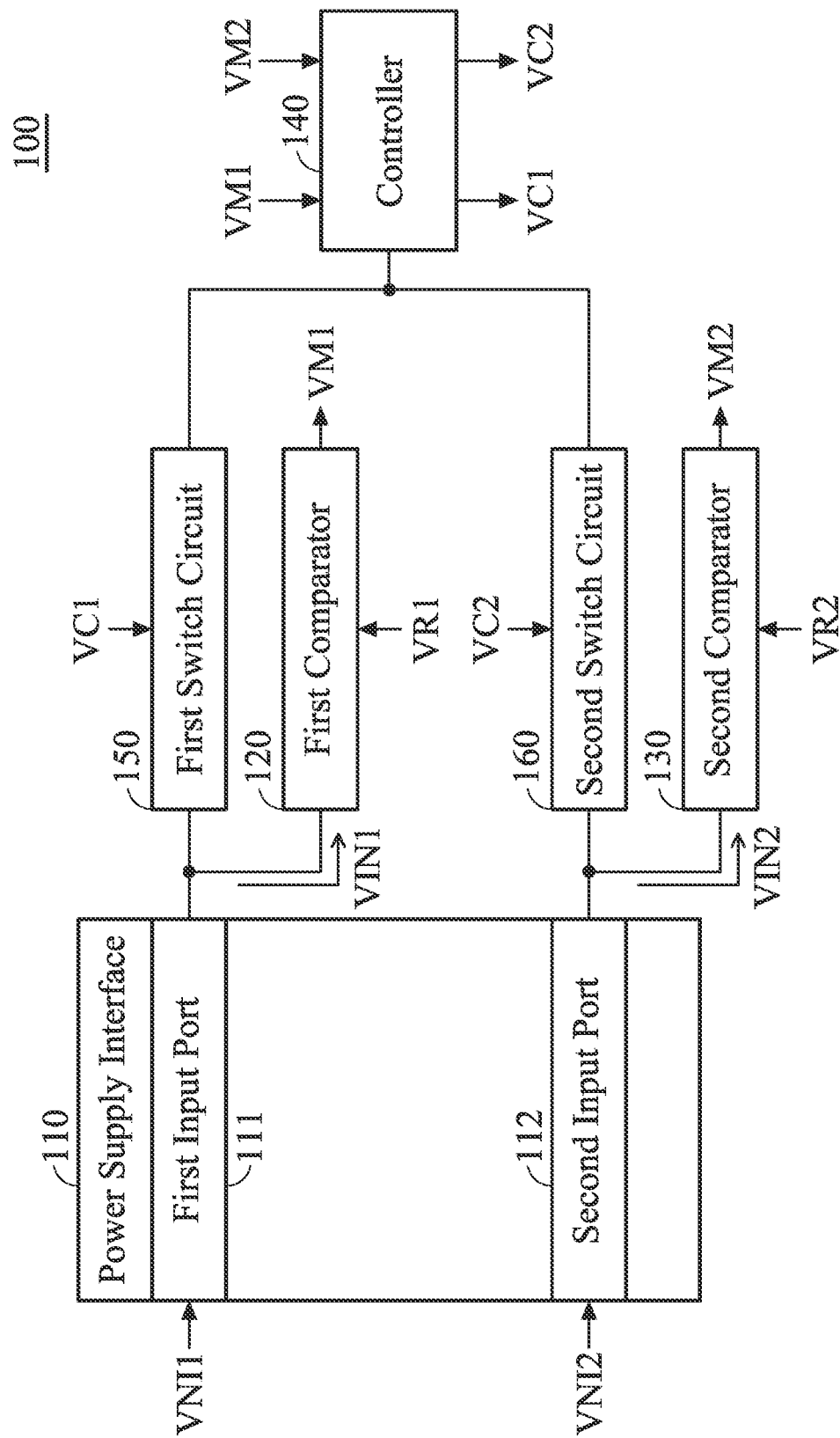
FIG. 1 is a diagram of an electronic device according to an embodiment of the invention.

In order to illustrate the purposes, features and advantages of the invention, the embodiments and figures of the invention are shown in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a diagram of an electronic device 100 according to an embodiment of the invention. For example, the electronic device 100 may be applied in a tablet computer or a notebook computer. In the embodiment of FIG. 1, the electronic device 100 includes a power supply interface 110, a first comparator 120, a second comparator 130, a controller 140, a first switch circuit 150, and a second switch circuit 160. It should be understood that the electronic device 100 may further include other components, such as a battery, a processor, and/or a housing, although they are not displayed in FIG. 1.

The power supply interface 110 includes a first input port 111 and a second input port 112. The first input port 111 is arranged for receiving a first input voltage VIN1. The second input port 112 is arranged for receiving a second input voltage VIN2. For example, the first input voltage VIN1 may be a DC (Direct Current) voltage from a first charger, and the second input voltage VIN2 may be another DC voltage from a second charger. The first input port 111 and the second input port 112 of the power supply interface 110 may be independent of each other. In some embodiments, the power supply interface 110 supports the USB Type-C standard.

The first comparator 120 compares the first input voltage VIN1 with a first reference voltage VR1, so as to generate a first comparison voltage VM1. The second comparator 130 compares the second input voltage VIN2 with a second reference voltage VR2, so as to generate a second comparison voltage VM2. Next, the controller 140 generates a first control voltage VC1 and a second control voltage VC2 according to the first comparison voltage VM1 and the second comparison voltage VM2. In some embodiments, the controller 140 is an EC (Embedded Controller) or a main circuit board.

The first switch circuit 150 is coupled between the first input port 111 of the power supply interface 110 and the controller 140. The first switch circuit 150 is selectively enabled or disabled according to the first control voltage VC1. For example, if the first control voltage VC1 has a high logic level (i.e., a logic "1"), the first switch circuit 150 may be enabled (or closed), conversely, if the first control voltage VC1 has a low logic level (i.e., a logic "0"), the first switch circuit 150 may be disabled (or opened).

The second switch circuit 160 is coupled between the second input port 112 of the power supply interface 110 and the controller 140. The second switch circuit 160 is selectively enabled or disabled according to the second control voltage VC2. For example, if the second control voltage VC2 has a high logic level, the second switch circuit 160 may be enabled (or closed), conversely, if the second control voltage VC2 has a low logic level, the second switch circuit 160 may be disabled (or opened).

With such a design, the electronic device 100 can control the operation states of the first switch circuit 150 and the second switch circuit 160 according to the first input voltage VIN1 and the second input voltage VIN2, thereby achieving the function of automatic detection. Once there is any change in the first input voltage VIN1 or the second input voltage VIN2, the electronic device 100 can perform corresponding adjustment operations, so as to optimize the whole performance of the electronic device 100.

The following embodiments will introduce the detailed structures of the electronic device 100. It should be understood that these figures and descriptions are merely exemplary, rather than limitations of the invention.

Figure 2:
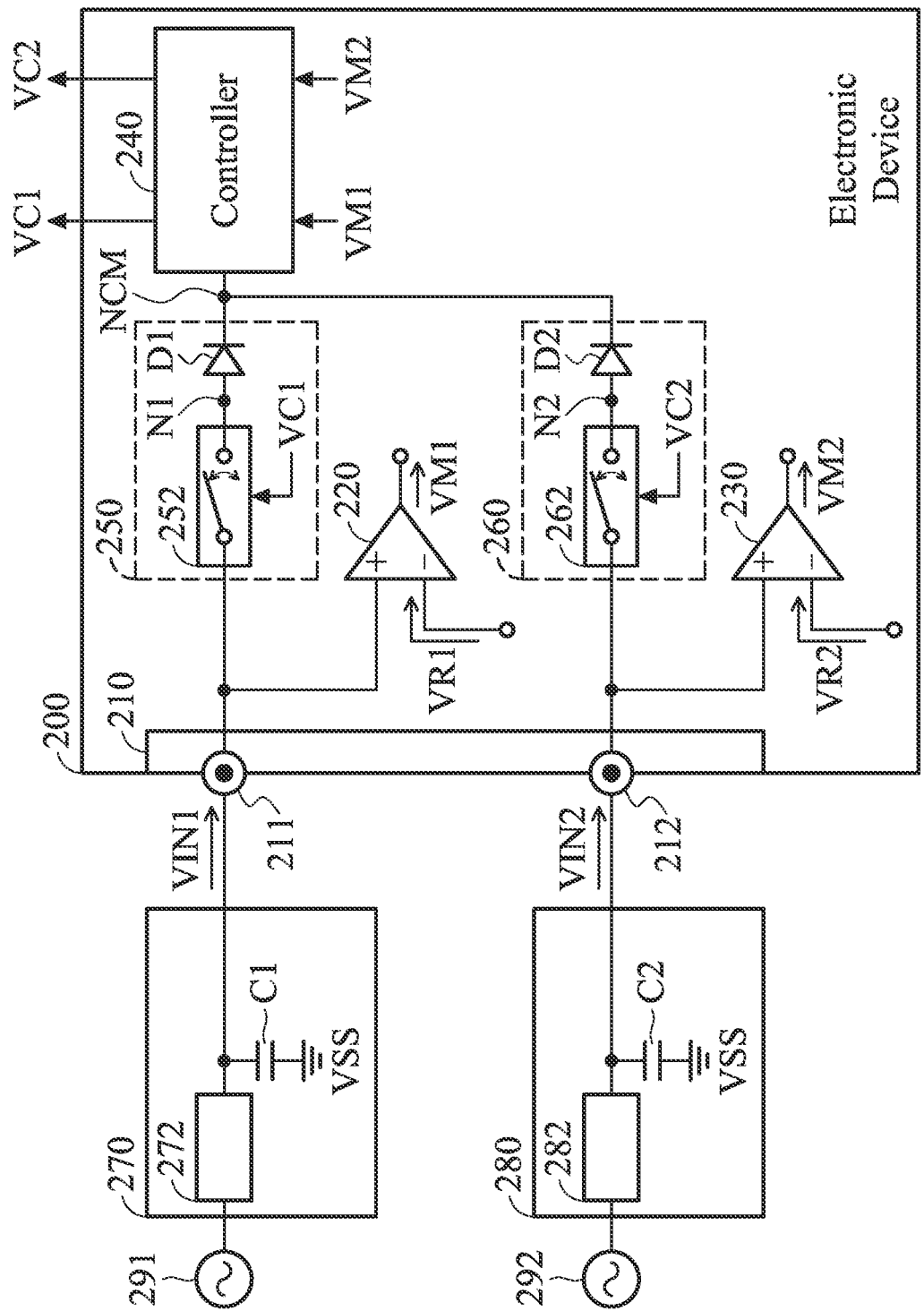
FIG. 2 is a diagram of an electronic device according to an embodiment of the invention.

FIG. 2 is a diagram of an electronic device 200 according to an embodiment of the invention. The electronic device 200 may be selectively coupled to a first charger 270 and/or a second charger 280. The first charger 270 may be further coupled to a first AC (Alternating Current) power source 291. The second charger 280 may be further coupled to a second AC power source 292. In the embodiment of FIG. 2, the electronic device 200 includes a power supply interface 210, a first comparator 220, a second comparator 230, a controller 240, a first switch circuit 250, and a second switch circuit 260. It should be understood that the first charger 270, the second charger 280, the first AC power source 291, and the second AC power source 292 are all external components, and they are not part of the electronic device 200.

The first charger 270 includes a first AC-to-DC converter 272 and a first capacitor C1. The first AC-to-DC converter 272 is coupled to the first AC power source 291, and is configured to generate a first input voltage VIN1. The first capacitor C1 has a first terminal for storing the first input voltage VIN1, and a second terminal coupled to a ground voltage VSS (e.g., 0V).

The second charger 280 includes a second AC-to-DC converter 282 and a second capacitor C2. The second AC-to-DC converter 282 is coupled to the second AC power source 292, and is configured to generate a second input voltage VIN2. The second capacitor C2 has a first terminal for storing the second input voltage VIN2, and a second terminal coupled to the ground voltage VSS.

The power supply interface 210 includes a first input port 211 and a second input port 212. The first input port 211 is arranged for receiving the first input voltage VIN1. The second input port 212 is arranged for receiving the second input voltage VIN2. The first input port 211 and the second input port 212 of the power supply interface 210 are independent of each other. In some embodiments, the power supply interface 210 supports the USB Type-C standard. When the first charger 270 is coupled to the electronic device 200, the first AC-to-DC converter 272 and the first capacitor C1 are both coupled to the first input port 211 of the power supply interface 210. In addition, when the second charger 280 is coupled to the electronic device 200, the second AC-to-DC converter 282 and the second capacitor C2 are both coupled to the second input port 212 of the power supply interface 210.

The first comparator 220 may be implemented with an operational amplifier. Specifically, the first comparator 220 has a positive input terminal for receiving the first input voltage VIN1, a negative input terminal for receiving a first reference voltage VR1, and an output terminal for outputting a first comparison voltage VM1. For example, if the first input voltage VIN1 is higher than or equal to the first reference voltage VR1, the first comparison voltage VM1 may have a high logic level, and conversely, if the first input voltage VIN1 is lower than the first reference voltage VR1, the first comparison voltage VM1 may have a low logic level. In some embodiments, the first reference voltage VR1 is substantially equal to 75% of the rated output voltage of the first charger 270. In alternative embodiments, the first reference voltage VR1 is higher than the minimum work voltage of the electronic device 200.

The second comparator 230 may be implemented with another operational amplifier. Specifically, the second comparator 230 has a positive input terminal for receiving the second input voltage VIN2, a negative input terminal for receiving a second reference voltage VR2, and an output terminal for outputting a second comparison voltage VM2. For example, if the second input voltage VIN2 is higher than or equal to the second reference voltage VR2, the second comparison voltage VM2 may have a high logic level, and conversely, if the second input voltage VIN2 is lower than the second reference voltage VR2, the second comparison voltage VM2 may have a low logic level. In some embodiments, the second reference voltage VR2 is substantially equal to 75% of the rated output voltage of the second charger 280. In alternative embodiments, the second reference voltage VR2 is higher than the minimum work voltage of the electronic device 200.

The controller 240 generates a first control voltage VC1 and a second control voltage VC2 according to the first comparison voltage VM1 and the second comparison voltage VM2. In some embodiments, the controller 240 is an EC or a main circuit board.

The first switch circuit 250 includes a first switch element 252 and a first diode D1. The first switch element 252 has a first terminal coupled to the first input port 211 of the power supply interface 210, and a second terminal coupled to a first node N1. The first diode D1 has an anode coupled to the first node N1, and a cathode coupled to a common node NCM. The common node NCM is further coupled to the controller 240. The first switch element 252 is selectively closed or opened according to the first control voltage VC1. For example, if the first control voltage VC1 has a high logic level, the first switch element 252 may be closed, conversely, if the first control voltage VC1 has a low logic level, the first switch element 252 may be opened.

The second switch circuit 260 includes a second switch element 262 and a second diode D2. The second switch element 262 has a first terminal coupled to the second input port 212 of the power supply interface 210, and a second terminal coupled to a second node N2. The second diode D2 has an anode coupled to the second node N2, and a cathode coupled to the common node NCM. The second switch element 262 is selectively closed or opened according to the second control voltage VC2. For example, if the second control voltage VC2 has a high logic level, the second switch element 262 may be closed, conversely, if the second control voltage VC2 has a low logic level, the second switch element 262 may be opened.

In some embodiments, the controller 240 determines the first control voltage VC1 and the second control voltage VC2 according to the first comparison voltage VM1, the second comparison voltage VM2, and a truth table. The aforementioned truth table may be described as the following Table I, where the value "1" represents a high logic level, and the value "0" represents a low logic level.

TABLE I

Truth Table of Controller

| | First Comparison Voltage VM1 | Second Comparison Voltage VM2 | First Control Voltage VC1 | Second Control Voltage VC2 |
|---|---|---|---|---|
| First Mode | 1 | 1 | 1 | 0 |
| Second Mode | 1 | 1 | 0 | 1 |
| Third Mode | 1 | 0 | 1 | 0 |
| Fourth Mode | 0 | 1 | 0 | 1 |
| Fifth Mode | 0 | 0 | 0 | 0 |

It should be noted that in the above Table I, either the first mode or the second mode is used. In other words, when both the first comparison voltage VM1 and the second comparison voltage VM2 have high logic levels, either the first switch element 252 or the second switch element 262 is closed according to different requirements, such that either the first switch circuit 250 or the second switch circuit 260 is enabled. For example, initially, the first charger 270 may transmit first charger information to the controller 240, and the second charger 280 may transmit second charger information to the controller 240 (initially, the first switch element 252 and the second switch element 262 are preset in closed states). Each charger information may include respective charger power and respective charger connection time. Based on the first and second charger information, the controller 240 can select either the first mode or the second mode, and provide appropriate input protection parameters.

In some embodiments, if both the first comparison voltage VM1 and the second comparison voltage VM2 have high logic levels, the controller 240 can determine which charger is coupled to the power supply interface 210 earlier, and then close the switch element corresponding to the charger (or enable the switch circuit corresponding to the charger). For example, it is assumed that the first charger 270 is coupled to the first input port 211 of the power supply interface 210 earlier, and the second charger 280 is coupled to the second input port 212 of the power supply interface 210 later. In this case, the controller 240 can generate the first control voltage VC1 with a high logic level for closing the first switch element 252, and generate the second control voltage VC2 with a low logic level for opening the second switch element 262.

In alternative embodiments, if both the first comparison voltage VM1 and the second comparison voltage VM2 have high logic levels, the controller 240 can determine which charger has larger output power, and then close the switch element corresponding to the charger (or enable the switch circuit corresponding to the charger). For example, it is assumed that the first charger 270 has lower output power, and the second charger 280 has larger output power. In this case, the controller 240 can generate the first control voltage VC1 with a low logic level for opening the first switch element 252, and generate the second control voltage VC2 with a high logic level for closing the second switch element 262.

In some embodiments, the rated output voltage of the first charger 270 is about 20V, the rated output voltage of the second charger 280 is about 20V, the first reference voltage VR1 is about 15V, the second reference voltage VR2 is about 15V, and the minimum work voltage of the electronic device 200 is about 10V. However, the invention is not limited thereto. In alternative embodiments, the rated output voltage of the first charger 270 is about 20V, the rated output voltage of the second charger 280 is about 10V, the first reference voltage VR1 is about 15V, the second reference voltage VR2 is about 7.5V, and the minimum work voltage of the electronic device 200 is about 5V.

It should be noted that after the first AC power source 291 relative to the first charger 270 is removed, the first comparator 220 can detect the drop of the first input voltage VIN1 right away, such that the first switch element 252 is immediately opened. Furthermore, after the second AC power source 292 relative to the second charger 280 is removed, the second comparator 230 can detect the drop of the second input voltage VIN2 right away, such that the second switch element 262 is immediately opened. Since the first reference voltage VR1 and the second reference voltage VR2 are both higher than the minimum work voltage of the electronic device 200, the electronic device 200 of the invention can solve the problems of slow detection and incorrect determination in the conventional design.

The invention proposes a novel electronic device. Generally, the invention has at least the advantages of fast detection, reducing the probability of incorrect determination, and increasing the efficiency, and therefore it is suitable for application in a variety of devices.

Note that the above element parameters are not limitations of the invention. A designer can fine-tune these settings or values according to different requirements. It should be understood that the electronic device of the invention is not limited to the configurations of FIGS. 1-2. The invention may merely include any one or more features of any one or more embodiments of FIGS. 1-2. In other words, not all of the features displayed in the figures should be implemented in the electronic device of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device selectively coupled to a first charger and a second charger, and comprising:
a power supply interface, comprising a first input port and a second input port, wherein the first input port is arranged for receiving a first input voltage, and the second input port is arranged for receiving a second input voltage;
a first comparator, comparing the first input voltage with a first reference voltage, so as to generate a first comparison voltage;
a second comparator, comparing the second input voltage with a second reference voltage, so as to generate a second comparison voltage;
a controller, generating a first control voltage and a second control voltage according to the first comparison voltage and the second comparison voltage;
a first switch circuit, coupled between the first input port and the controller, wherein the first switch circuit is selectively enabled or disabled according to the first control voltage; and
a second switch circuit, coupled between the second input port and the controller, wherein the second switch circuit is selectively enabled or disabled according to the second control voltage;
wherein the first switch circuit comprises:
a first switch element, wherein the first switch element has a first terminal coupled to the first input port of the power supply interface, and a second terminal coupled to a first node; and
a first diode, wherein the first diode has an anode coupled to the first node, and a cathode coupled to a common node;
wherein the common node is further coupled to the controller, and the first switch element is selectively closed or opened according to the first control voltage.

2. The electronic device as claimed in claim 1, wherein the power supply interface supports a USB (Universal Serial Bus) Type-C standard.

3. The electronic device as claimed in claim 1, wherein the first reference voltage is equal to 75% of a rated output voltage of the first charger.

4. The electronic device as claimed in claim 1, wherein the first comparator has a positive input terminal for receiving the first input voltage, a negative input terminal for receiving the first reference voltage, and an output terminal for outputting the first comparison voltage.

5. The electronic device as claimed in claim 1, wherein the second reference voltage is equal to 75% of a rated output voltage of the second charger.

6. The electronic device as claimed in claim 1, wherein the second comparator has a positive input terminal for receiving the second input voltage, a negative input terminal for receiving the second reference voltage, and an output terminal for outputting the second comparison voltage.

7. The electronic device as claimed in claim 1, wherein after a first AC (Alternating Current) power source relative to the first charger is removed, the first switch element is immediately opened.

8. The electronic device as claimed in claim 1, wherein the second switch circuit comprises:
a second switch element, wherein the second switch element has a first terminal coupled to the second input port of the power supply interface, and a second terminal coupled to a second node; and
a second diode, wherein the second diode has an anode coupled to the second node, and a cathode coupled to the common node;
wherein the second switch element is selectively closed or opened according to the second control voltage.

9. The electronic device as claimed in claim 8, wherein after a second AC power source relative to the second charger is removed, the second switch element is immediately opened.

* * * * *